United States Patent [19]
Borcherts et al.

[11] Patent Number: 5,245,422
[45] Date of Patent: Sep. 14, 1993

[54] SYSTEM AND METHOD FOR AUTOMATICALLY STEERING A VEHICLE WITHIN A LANE IN A ROAD

[75] Inventors: Robert H. Borcherts, Ann Arbor; Jacek L. Jurzak, Rochester Hills; Shih-Ping Liou, Ann Arbor; Tse-Liang A. Yeh, Rochester Hills, all of Mich.

[73] Assignee: Zexel Corporation, Japan

[21] Appl. No.: 722,661

[22] Filed: Jun. 28, 1991

[51] Int. Cl.⁵ .............................................. H04N 7/18
[52] U.S. Cl. ................................ 358/103; 364/424.02; 364/426.04
[58] Field of Search ............................ 358/103, 105; 364/424.01, 424.02, 426.01, 426.04; 180/179

[56] References Cited

U.S. PATENT DOCUMENTS

| | | | |
|---|---|---|---|
| 4,703,429 | 10/1987 | Sakata | 364/426.04 |
| 4,757,450 | 7/1988 | Etoh | 364/426.04 |
| 5,014,200 | 5/1991 | Chundrlik et al. | 364/426.04 |
| 5,081,585 | 1/1992 | Kurami et al. | 358/103 X |
| 5,087,969 | 2/1992 | Kamada et al. | 358/103 |

FOREIGN PATENT DOCUMENTS

| | | |
|---|---|---|
| 0354561 | 8/1989 | European Pat. Off. . |
| 0354562 | 8/1989 | European Pat. Off. . |
| 0361914 | 9/1989 | European Pat. Off. . |
| 1-66712 | 3/1989 | Japan . |
| 1-106910 | 7/1989 | Japan . |
| 2-48704 | 2/1990 | Japan . |
| 2-48705 | 2/1990 | Japan . |
| 2-48706 | 2/1990 | Japan . |
| 2-90379 | 3/1990 | Japan . |
| 2-90380 | 3/1990 | Japan . |
| 2-90381 | 3/1990 | Japan . |
| 9005957 | 5/1990 | PCT Int'l Appl. . |

OTHER PUBLICATIONS

E. D. Dickmanns et al. Applications of Dynamic Monocular Machine Vision. Machine Vision and Applications (1989) 1:241-261.

*Primary Examiner*—Victor R. Kostak
*Attorney, Agent, or Firm*—Harness, Dickey & Pierce

[57] ABSTRACT

An automatic vehicle steering system is provided for automatically steering a vehicle along a lane in a road. A video sensor is included for generating a plurality of frames of video images of the road. A computer processor analyzes the frames to determine the lane boundaries of the road and the position of the vehicle. The system advantageously utilizes engagement of a cruise control switch and a steering control switch to initiate processing of the image data and automatic steering of the vehicle. In such manner, the reliability and efficiency of the system is increased while at the same time minimizing complexity and cost.

27 Claims, 16 Drawing Sheets

SYSTEM AND METHOD FOR AUTOMATICALLY STEERING A VEHICLE WITHIN A LANE IN A ROAD

BACKGROUND OF THE INVENTION

Technical Field

This invention relates to digital image processing systems, and, more particularly, to systems for automatically controlling the steering of a vehicle.

Discussion

The technical literature suggests the desirability of a control system for automatically controlling the steering of a vehicle. Representative examples of some known approaches are disclosed in European Patent Application Nos. EP 0 354 56 A2 filed Aug. 9, 1989 and EP 0 361 914 A2 filed Sep. 28, 1989, both assigned to Honda Giken Kogyo Kabushiki Kaisha, Japanese Application No. 62-97935 and European Patent Application No. EP 0 304 042 A2 filed Aug. 17, 1988 assigned to Kabushiki Kaisha Toshiba. Briefly, these documents disclose the general concept of using a video input device, such as a camera, that is mounted to the vehicle and a computer processor for processing the image data and providing control signals to mechanisms for controlling the steering of the vehicle.

Generally, the prior art approaches do not appear to be cost effective. As a result, their implementation in a vehicle affordable by the ordinary consumer is not very practical. One reason for the expense is that most of these techniques process the video input data in a very complex manner. For example, the EP '914 application utilizes a Hough transform to analyze the image data. The use of transforms of these types are relatively sophisticated and difficult to analyze thereby requiring expensive computer equipment to perform the analysis since an exceedingly large amount of data is required in order to perform these transforms.

Most of the known systems continuously analyze all of the video input data and the majority of their algorithm parameters are either fixed or predetermined. As a result, the processor is given the enormous task of isolating those smaller areas of interest that contain meaningful image data points. The prior art systems also generally require an extensive manual tuning effort for each specific traffic scene and condition. Even so, there is no high degree of probability that the processor has correctly detected the actual lane boundary lines that are often used as criteria for controlling the vehicle steering. This is because there is no good preset criteria for initiating the processing of the image data associated only with relevant road features. As a result, the processor's power and resources are often wasted in processing image data from scenes which do not actually contain the lane boundary lines. In addition, the prior art approaches do not generally embody any mechanisms which allow the driver of the vehicle to operate the automatic steering control system only when traffic conditions are proper and safe.

SUMMARY OF THE INVENTION

In accordance with the preferred embodiment of the present invention, a system is provided for automatically steering a vehicle. Included is a sensor which is mounted to the vehicle and generates position information about the road in front of the vehicle. The vehicle contains a cruise control system that has a switch for initiating vehicle speed control. The invention advantageously utilizes the actuation of the cruise control switch to initiate the processing of the sensor information and to provide automatic steering control of the vehicle under safe traffic and road conditions. A programmable processor provides signal processing and analyzes the information, while a steering controller controls the steering of the vehicle as a function of the analysis by the processor.

BRIEF DESCRIPTION OF THE DRAWINGS

The various advantages of the present invention will become apparent to those skilled in the art by reading the following specification and by reference to the drawings in which.

DETAILED DESCRIPTION OF THE PREFERRED EMBODIMENT

Figure 1:
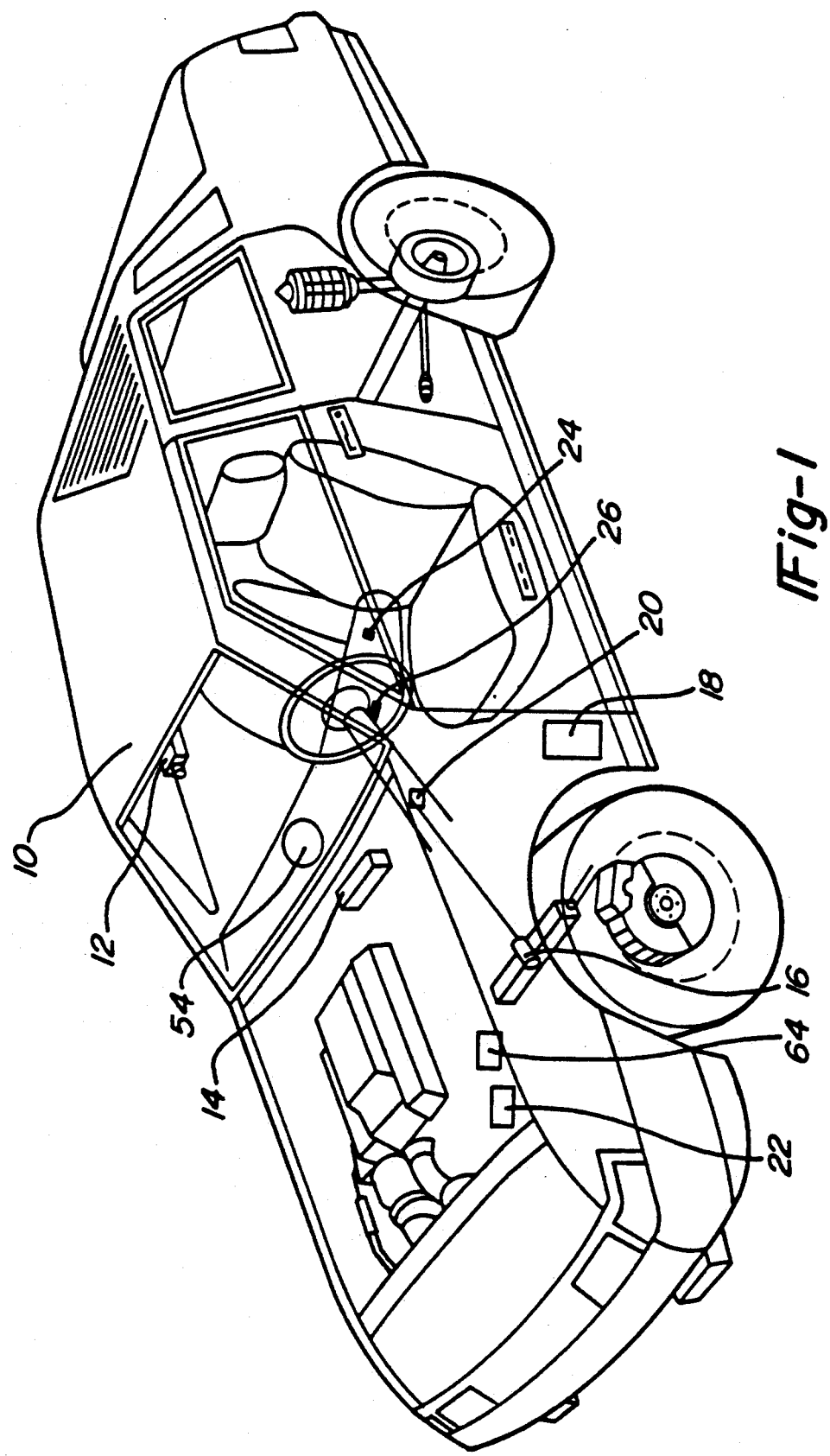
FIG. 1 is a schematic diagram of a vehicle equipped with an automatic vehicle steering system in accordance with the present invention.

Turning now to FIG. 1, a vehicle 10 is shown therein which illustrates the essential components of the automatic vehicle steering system in accordance with the present invention. An image input device 12 is mounted to the front portion of the vehicle 10 at a location near the rear view mirror assembly. Such a device may be a video camera of the conventional or infrared kind and is used to monitor the road geometry and traffic condition in front of the vehicle 10 by providing a plurality of frames of video images of the road. Image input device 12 may be mounted in combination with the rear view mirror assembly or separate therefrom or at any other location which adequately monitors the road in front of the vehicle 10.

An image digitization electronics and processing unit 14 is shown mounted under the hood of the vehicle 10. The processing unit 14 may be one of several standard off the shelf programmable processors capable of providing image processing. Image digitization and electronics and processing unit 14 is made up of both hardware and software. The hardware is connected to image input device 12 and contains all the signal conditioning electronics. Included in the hardware are image digitizing frame grabbers for converting each frame of the analog video images to digital signals or pulses, and computer processors for providing digital image processing. The software provides control for the image input device 12, image processing for lane detection and a predictor for improving the efficiency of the image processing function by providing for the necessary search area.

A steering control actuator 16 is mounted on the vehicle 10. Steering control actuator 16 may be either hydraulic or electric and controls the steering angle of the wheels, subject to the manual steering override by the driver, so that the vehicle is at the desired position within the lane in the road when the automatic vehicle steering system is engaged.

Steering actuator electronics and control unit 18 is also mounted to the vehicle 10. Steering actuator control unit 18 drives the steering control actuator 16 so that the vehicle motion follows the desired path provided from the output of the image digitization electronics and processing unit 14.

Wheel angle and driver steer sensors 20 are mounted to the vehicle 10. The wheel angle sensor measures the steering wheel angle. The driver steer sensor measures the driver force applied to the steering wheel to detect driver effort in controlling the steering wheel. The detection of a significant driver steer will temporarily disengage the steering control actuator 16 so that the automatic vehicle steering function is overridden by conventional driver steering.

A conventional cruise control system 22 is employed to provide automatic vehicle speed control of the vehicle 10. A manually actuable cruise control switch 26 is mounted inside the vehicle 10 for engaging the cruise control system 22. It is generally assumed that the cruise control system 22 is engaged when the vehicle is under proper and safe traffic and road conditions.

An automatic steering switch 24 is also mounted to the interior of the vehicle 10. Automatic steering switch 24 allows the driver to engage the automatic vehicle steering system. In order to engage the automatic vehicle steering system to steer the vehicle 10, the system requires that both the cruise control switch 26 and automatic steering switch 24 be engaged. Cruise control switch 26 and automatic steering switch 24 can also be configured such that with the cruise control system 22 disengaged, engagement of the automatic steering switch 24 will also simultaneously engage the cruise control switch 22 which also engages the cruise control system 22, thereby providing engagement of the automatic vehicle steering system. On the other hand, when the cruise control system 22 or switch 26 is disengaged, the automatic steering switch 24 and the automatic steering control function are both disengaged.

Two additional system components are included, whose location in the vehicle 10 are irrelevant. The first being a sensor and vehicle system interface 64 which includes a standard vehicle speed sensor added to the standard vehicle equipment, a vehicle power supply interface and a standard vehicle cruise system interface. The vehicle speed sensor may be used for steering control purposes to modify controller response time thereby enhancing the operation of the automatic vehicle steering system. The vehicle power supply and cruise control interface may be necessary to connect the video cruising system to the standard vehicle equipment to ensure that both systems operate properly.

The second is a driver interface and warning information center 54 which may consist of audio, visual and other sensory interactions. Such devices may inform the driver about performance of the automatic vehicle steering system to enable the driver to make proper judgment on the safety of the driving situation.

In operation, the driver, while driving the vehicle 10 on a road having lanes such as a freeway, may engage the automatic vehicle steering system. During normal weather and driving conditions, the driver is required to have engaged both the cruise control switch 26 and automatic steering switch 24. With the cruise control system 22 engaged, the driver may engage the automatic steering switch 24 to engage the automatic vehicle steering system. With the cruise control system 22 disengaged, the system may be configured so that engagement of the automatic steering switch will further cause engagement of the cruise control switch 26 to thereby allow engagement of the automatic steering system. By requiring engagement of the cruise control system 22, the system may assume that the vehicle is under proper and safe traffic road conditions.

Engagement of the automatic vehicle steering system initiates the video input device 12. Video input device 12 generates a continuous plurality of frames of video images of the road in front of the vehicle 10. The image digitization electronics and processing unit 14 receives and analyzes the frames of the video images. In doing so, processing unit 14 converts the analog inputs from each frame to a plurality of digital signals. Processing unit 14 then analyzes the digital signals and attempts to detect the lane boundaries on both sides of the vehicle 10. Furthermore, processing unit 14 analyzes the path and determines the proper directional response needed to maintain the vehicle 10 in the desired position within the lane.

The automatic vehicle steering system utilizes the processed data to lock on to the lane and steer the vehicle 10 in a desired position therein. In doing so, the processing unit 14 provides a directional control response to steering actuator control unit 18 which in turn directs steering control actuator 16 to steer the vehicle in the desired direction. Wheel angle and driver steer sensors 20 measure the steering wheel angle and furthermore measure and detect driver effort to override the automatic vehicle steering system. The detection of a significant driver steer by the driver steer sensor will result in temporary disengagement of the steering control actuator 16 thereby temporarily disengage the automatic vehicle steering system. This may occur, for example, when the driver of the vehicle 10 changes lanes. Once in the new lane the automatic vehicle steering system will be re-engaged to provide steering within the new lane provided the driver is no longer manually overriding the automatic steering of the vehicle 10.

Figure 2A:
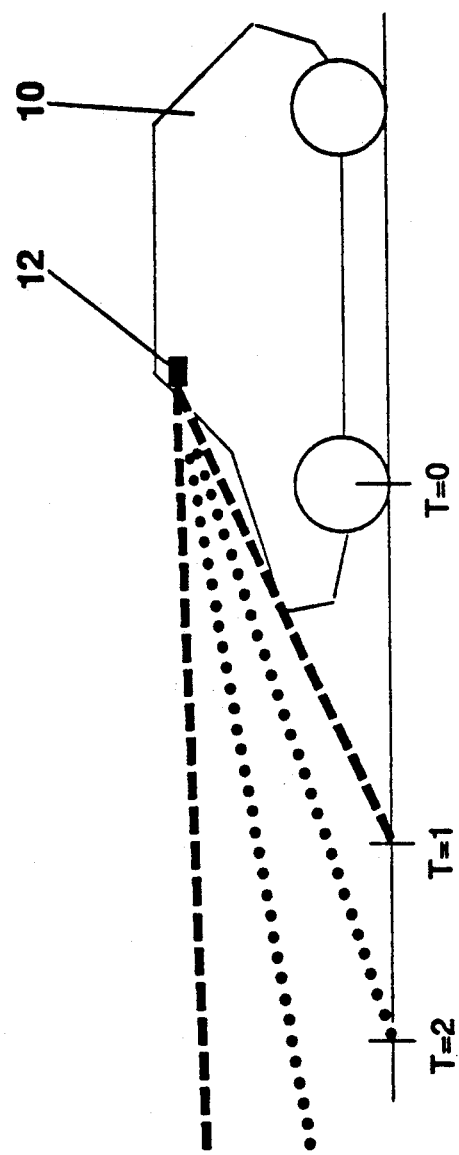
FIGS. 2A-2B are schematic diagrams which illustrate detection of the lane in the road in front of the vehicle.
Figure 2B:
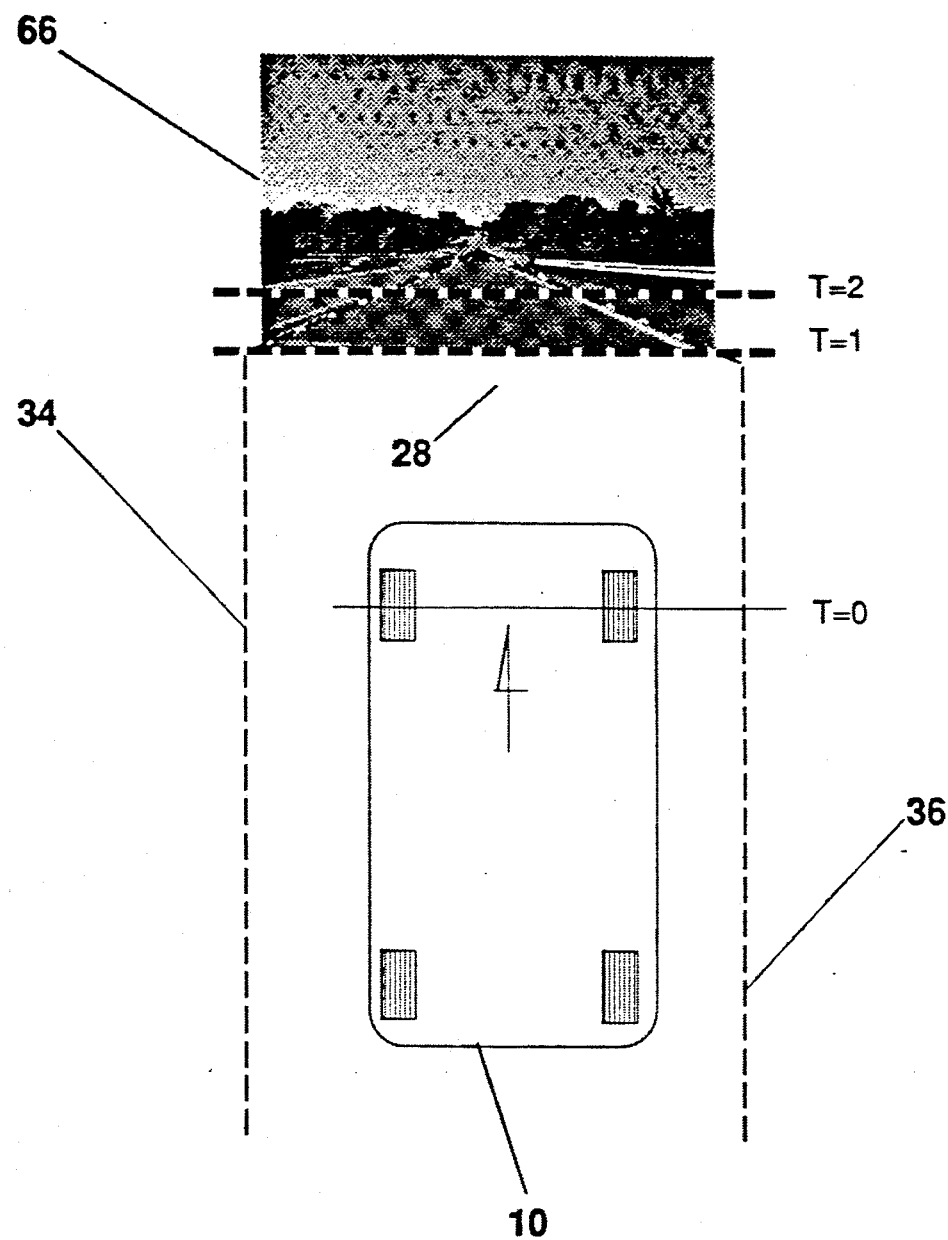

FIGS. 2A and 2B illustrate the basic geometry involved for providing images of the road for the automatic vehicle steering system. Vehicle 10 is shown within the lane of a road 28 having a left lane boundary 34 and a right lane boundary 36. Image input device 12 monitors the road geometry and provides a plurality of frames of video images of the road in front of the vehicle 10 such as frame 66.

Figure 3:
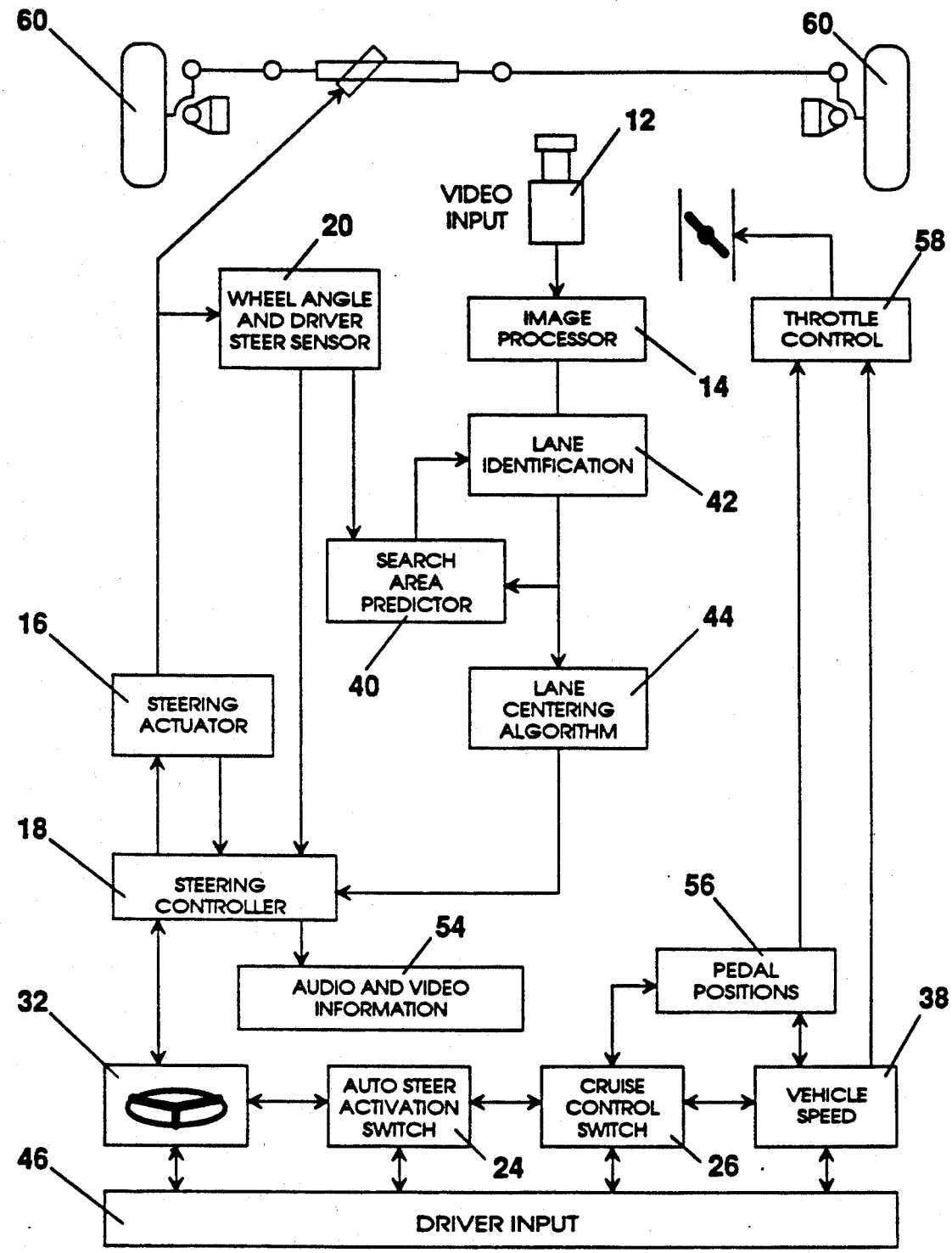
FIG. 3 is a block diagram which illustrates the system configuration in accordance with the present invention.

FIG. 3 illustrates the system configuration for the automatic vehicle steering system. Video input device 12 provides continuous frames of the road in front of the vehicle 10 to image processor 14. Image processor 14 performs lane identification 42 within the area specified by the search area predictor 40 and furthermore, a lane centering algorithm 44. Search area predictor 40 provides the necessary search area in an efficient manner. The response signal from lane centering algorithm 44 is provided to steering controller 18, which in turn controls steering actuator 16. Steering actuator 16 adjusts the angle of the wheels 60 of vehicle 10 to direct the vehicle 10 in the desired direction.

Wheel angle and driver steer sensors 20 measure the wheel angle and detect conventional driver steering. Wheel angle and driver steer sensors 20 are adapted to provide a signal to search area predictor 40. The image processor 14 receives this signal and uses the wheel angle signal to check for a consistent steering angle sufficient to allow for the initiation of the system. The wheel angle signal further provides the image processor 14 with vehicle turning information. As such, the processor 14 is able to use this information to provide for a better prediction of the lane position. The wheel angle and driver steer sensors 20 are further adapted to provide a driver steer signal to steering controller 18 to disengage steering actuator 16 when the driver manually operates the steering wheel 32 while the automatic vehicle steering system is engaged. A wheel angle signal is also provided to steering controller 18. Steering controller 18 is further adapted to receive inputs from steering wheel 32 and steering actuator 16. Furthermore, steering controller 18 is adapted to provide signals to a warning system 54.

Cruise control switch 26 engages the cruise control system 22 which is adapted to control vehicle speed 38 by controlling throttle control 58 which in turn controls the throttle 60. The cruise control switch 26, vehicle speed 38, automatic steering switch 24 and steering wheel 32 are adapted to receive driver inputs 46. Automatic steering switch 24 is further adapted to receive cruise control inputs from cruise control switch 26. Automatic steering switch 24 in turn communicates with steering wheel 32. Cruise control switch 26 further communicates with pedal positions 56 which in turn controls throttle control 58.

Figure 4A:
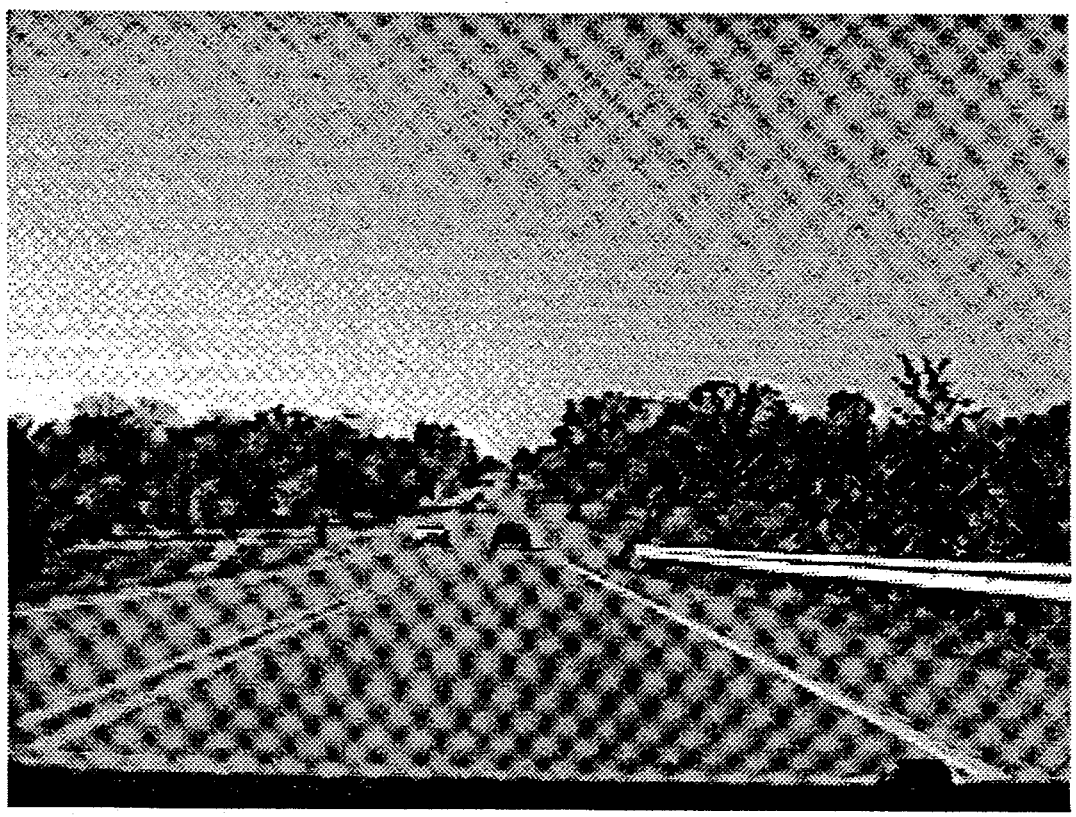
FIGS. 4A-4C are pictures which illustrate the operation of the present invention.
Figure 4B:
Figure 4C:
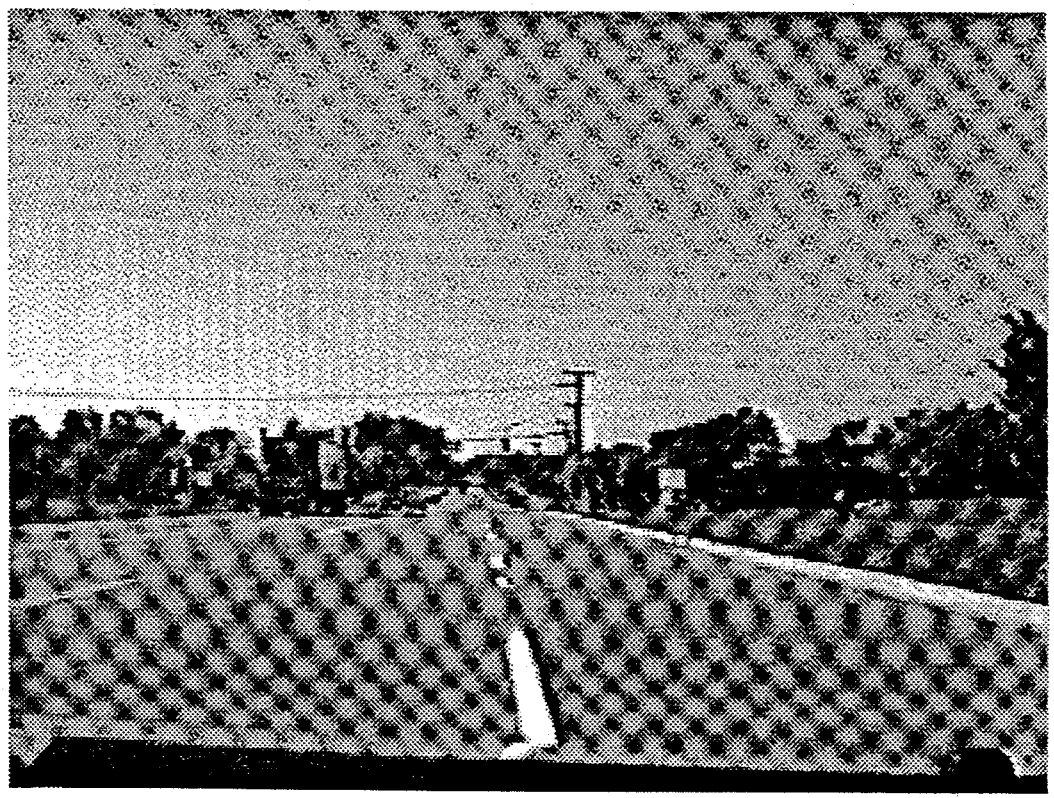

FIGS. 4A–4C are photographs which illustrate the operation of the automatic vehicle steering system. FIGS. 4A–4C illustrate operation of the vehicle 10 within the lane boundaries of the road. The automatic steering system maintains the vehicle 10 at the desired location within the lane, under normal traffic conditions. FIG. 4C illustrates the vehicle 10 changing lanes, whereby the automatic vehicle steering system is temporarily disengaged as long as the driver manually operates the steering. Once in the desired position of the new lane the driver may discontinue manual steering which re-engages the automatic vehicle steering system.

Figure 5:
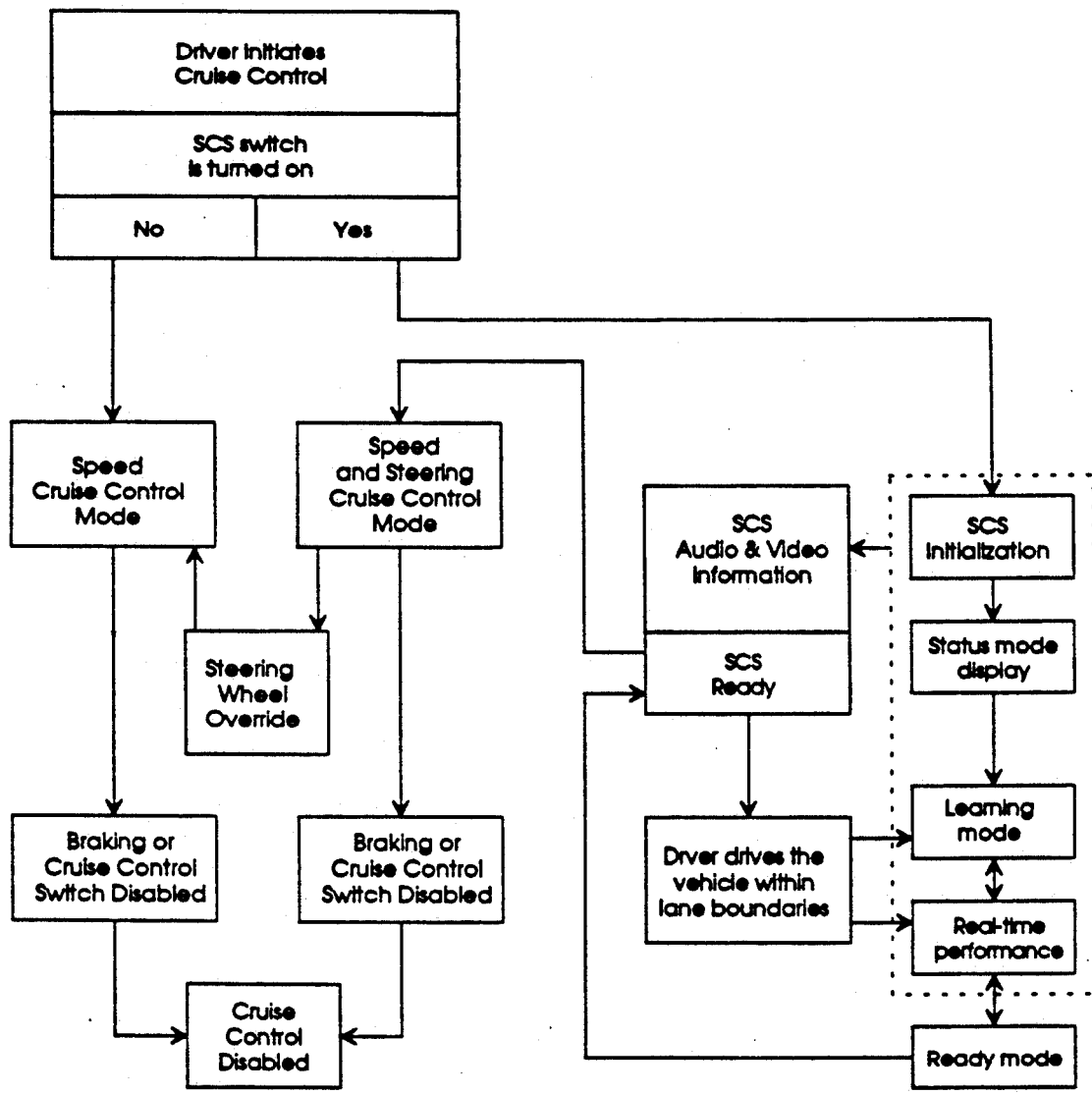
FIG. 5 is a flow diagram which illustrates the processing steps.

The flow chart in FIG. 5 illustrates the processing steps performed by the automatic vehicle steering system. The driver of the vehicle 10 initially turns on the cruise control switch 26 to engage the cruise control system 22 or turns the automatic steering switch 24 to engage both the cruise control system 22 and automatic vehicle steering system. With the cruise control system 22 engaged and the automatic vehicle steering disengaged or not ready to operate, the vehicle maintains speed control in the cruise control mode unless the cruise control system 22 is disengaged. Cruise control system 22 may be disengaged by conventional techniques such as applying the brakes or disengaging the cruise control switch 26 or may be temporarily disengaged while manually depressing the throttle control 58. With the cruise control system 22 and the automatic vehicle steering switch 24 both engaged, the vehicle 10 locks on to the lane and operates in the speed and steering cruise control mode until being disengaged.

The automatic vehicle steering system may be disengaged in several ways. The driver may disengage the vehicle steering system by turning off either the cruise control switch 26 or the automatic steering switch 24. Depressing the brake pedal will further disengage the system. Temporary disengagement will result from manual driver steer. When the driver depresses the throttle control 58 the cruise control system 22 will be temporarily overridden, however, the automatic vehicle steering system will continue to steer the vehicle.

When the driver engages the automatic vehicle steering system, the system initially undergoes an initialization process. Audio and video information is provided to the driver of the vehicle 10 which indicates whether the system is ready. During automatic vehicle steering system initialization, all that is required of the driver is that he maintain the vehicle in the desired position between the lane boundaries of the road.

FIGS. 6–11 illustrate how processing unit 14 operates to analyze the frames of road images and predict the path of the lane in the road in front of the vehicle 10. Processing unit 14 receives a continuous series of frames of the road in front of the vehicle 10 from image input device 12. Image input device 12 provides frames of images at a rate of thirty frames per second, capable of providing an adequate response for vehicles travelling at normal highway speeds. For higher speeds, the system may require a higher rate of frame speed.

The processing unit 14 includes image digitizing frame grabbers for receiving each analog input frame from image input device 12 and converting each frame to a plurality of digital signals. Processing unit 14 includes computer processors for providing digital processing to analyze the digital information provided by the image digitizing frame grabbers. Processing unit 14 is further equipped with software for controlling the image input device, image processing for lane detection and a predictor to improve the efficiency of the image processing function.

In order to locate the lane boundaries in the image of a road scene, the processing unit 14 first detects all edge points in the image. In doing so, there are certain assumptions that are made in order to simplify the problem. For an automatic vehicle steering system we first assume low curvature lane boundaries. In addition, we assume that in most situations a pair of boundaries exist. Finally, it is assumed that the ground is locally level and the images are taken while the car is in the lane of the road. This letter assumption is usually correct because the driver is likely to engage the cruise control switch 22 and/or steering control switch only when the car is travelling between one lane boundaries and the car is usually travelling in a straight line. Under these assumptions, the location of the lane in the image can be predicted by the predictor 40 based on lane curvature, vehicle dynamics and steering inputs.

Two main lane boundaries are modeled close to the vehicle using two parallel line segments. The first line segment being the tangent to the current left lane boundary 34 and the second being tangent to the current right lane boundary 36. Due to the projective geometry of the image, these two convergent lines must converge at a point in the image called a vanishing point 84.

Figure 7A:
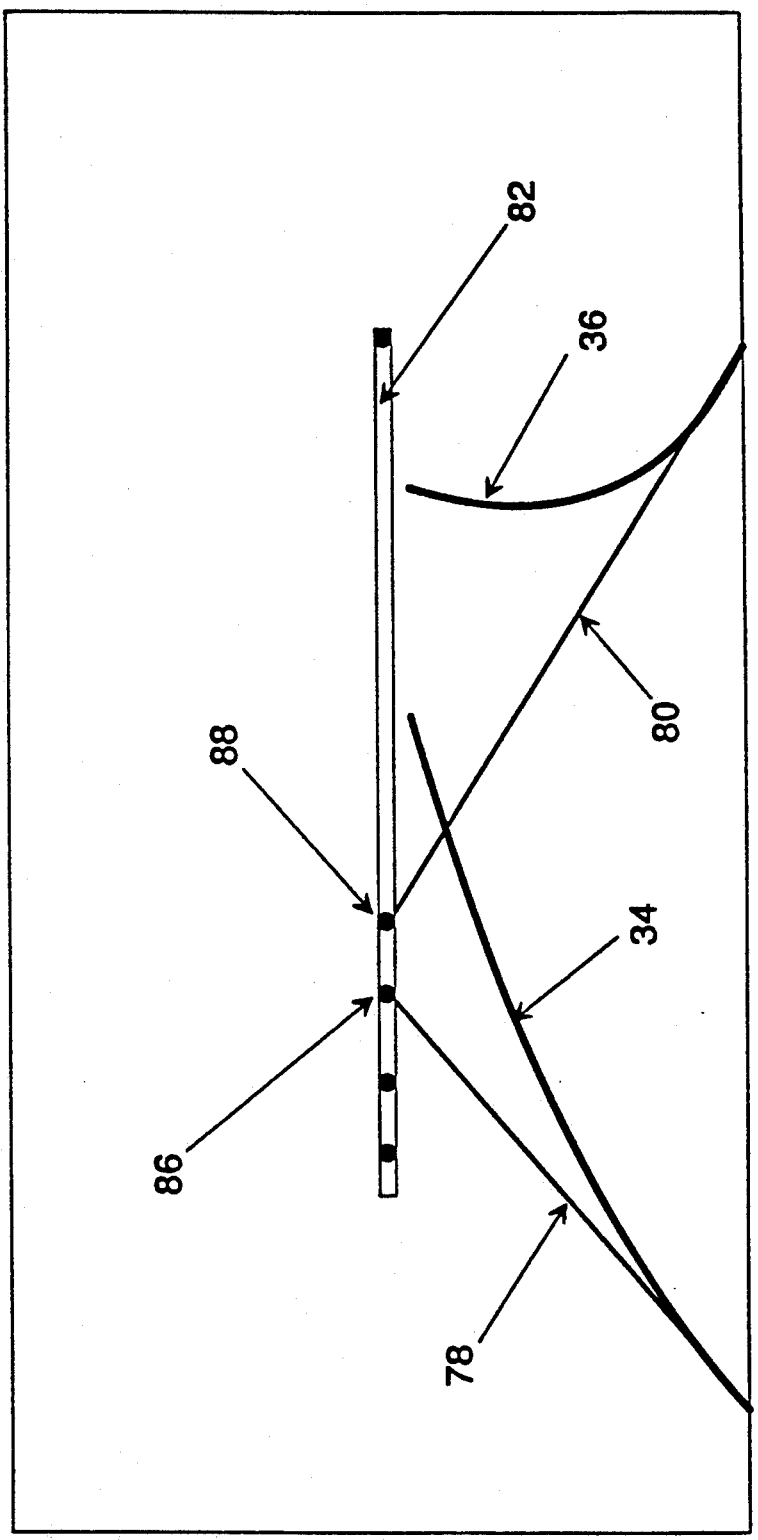
FIGS. 7A-7C are continued schematic diagrams illustrating the detection and prediction of the lane in the road.
Figure 7B:
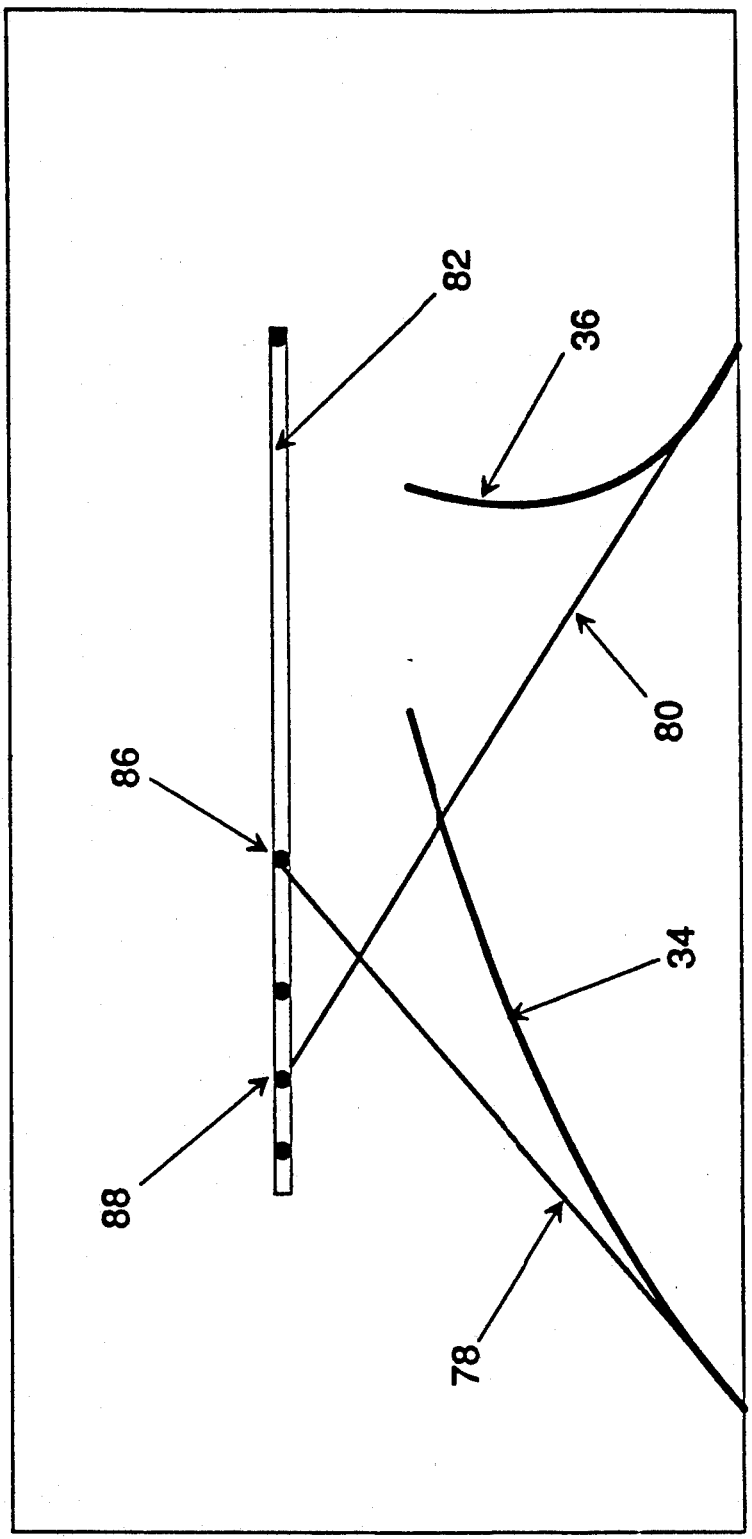
Figure 7C:
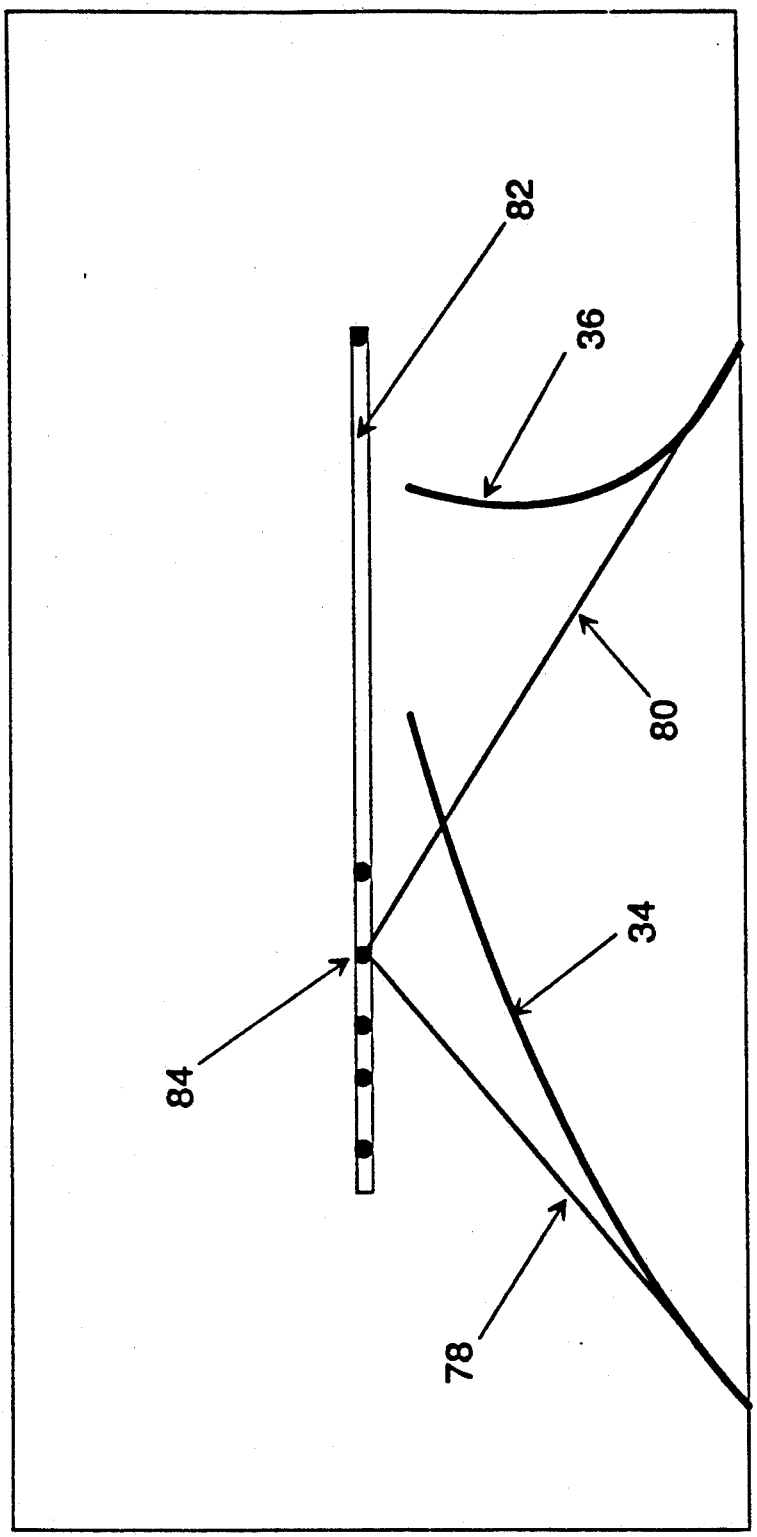

The best two convergent lines are essentially chosen from a set of candidates. Here, however, we will use two intersection points 86 and 88, that is, where the left convergent line 78 and the right convergent line 80 each cross the chosen search area 82 as shown in FIG. 7. The use of two intersection points rather than one vanishing point allows for the ability to follow the lane in situations where one side of a lane boundary is less prominent than the other or is completely missing.

Since the location of the intersection points does not change much between two continuous frames, an assumption is made that its location in the current frame will be close to that in the previous frame. This fact allows for combining road edge detection and intersection point determination in one step.

Figure 8:
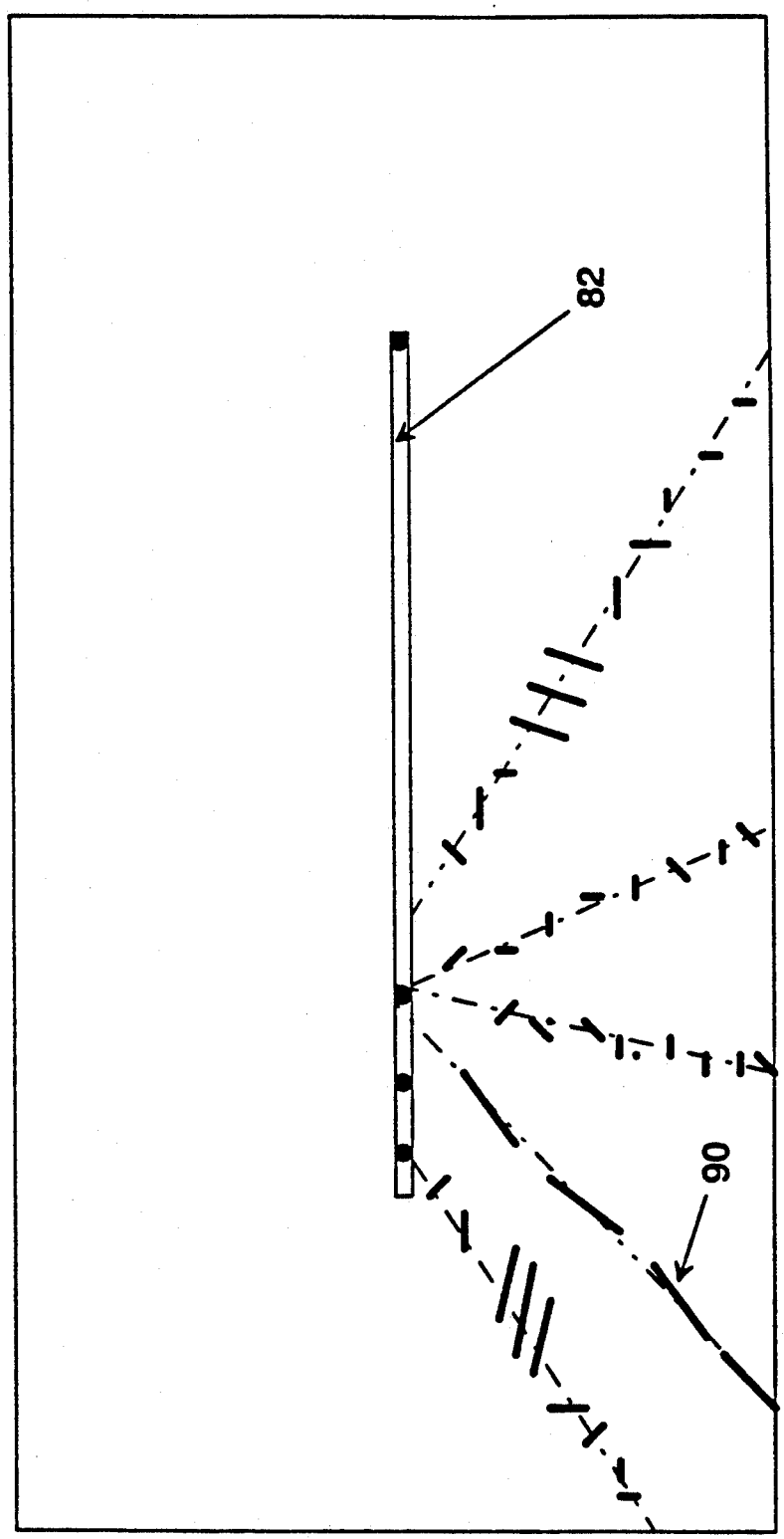
FIG. 8 is a continued schematic diagram illustrating the detection and prediction of the lane in the road.

To select the two best intersection points, the algorithm collects evidence supporting each candidate from the image. The supporting evidence, coming from the pixel level local computation, includes the strength and direction of edge points and length of line segments. Functions are provided to measure the support of each of the evidence and combine them in the performance measure that gives confidence in an intersection point. The intersection point having the highest confidence is selected and the corresponding convergent line is considered as the image of the lane boundary. FIG. 8 illustrates the characteristics of such an image. Shown therein are edge responses and associated orientation of several line samples. It is desirable to obtain the data that provides a strong edge response in addition to a consistent orientation such as line 90. The overall response is then used to calculate the intersection point for that boundary line within a chosen search area 82.

Figure 6:
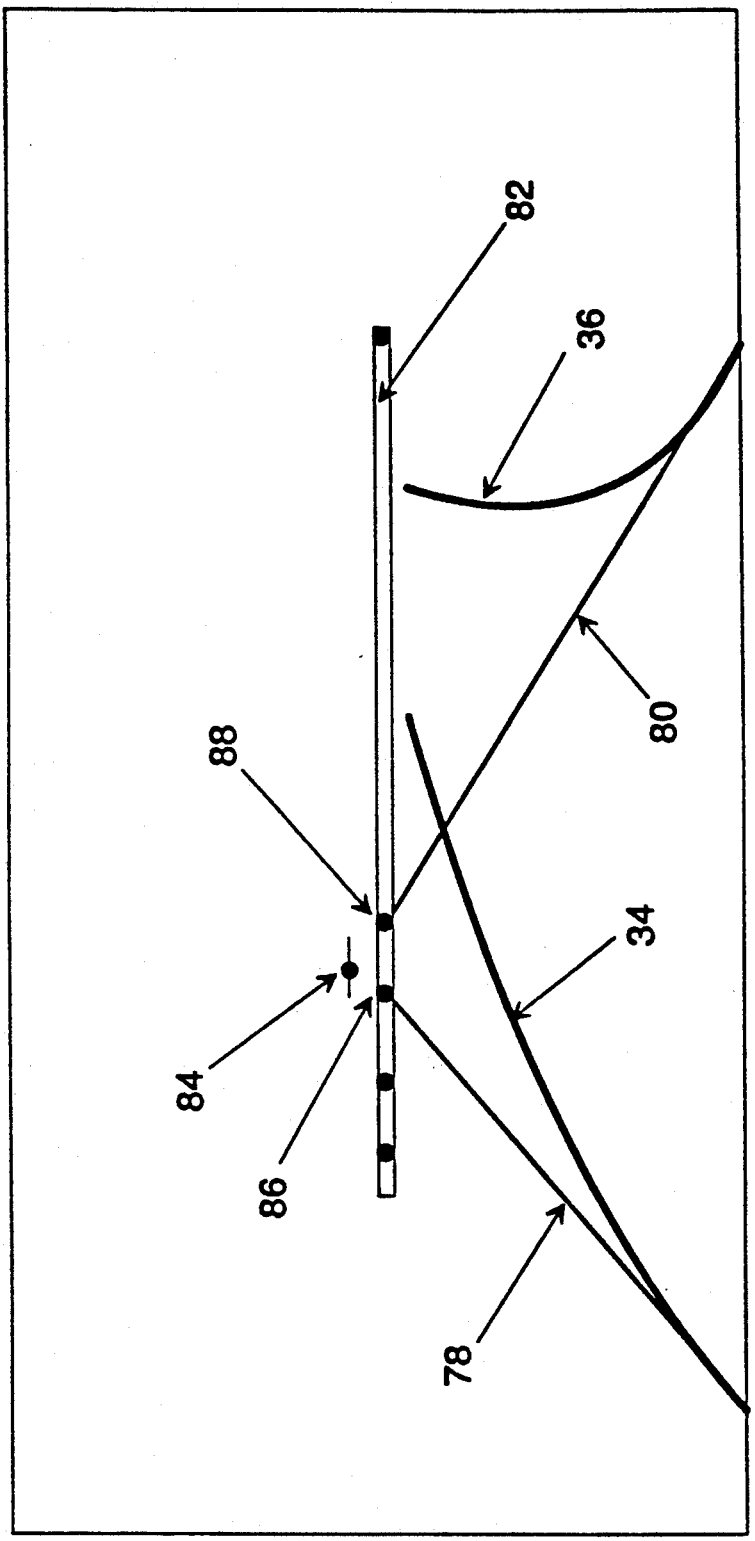
FIG. 6 is a schematic diagram illustrating the detection and prediction of the lane boundaries in the road in front of the vehicle.

FIG. 6 illustrates a left convergent line 78 and a right convergent line 80 as both pass through the chosen search area 82 to obtain the left convergent line intersection point 86 and the right convergent line intersection point 88. Left and right convergent lines 78 and 80 cross at the point known as the vanishing point 84. It is most desirable to obtain the intersection of intersection points 86 and 88 or vanishing point 84 within the search area 82. In order to do so, the system employ a predictor to continuously adjust the search area as shown in FIG. 7. The predictor determines the area in which to search. Upon system initialization, the predictor initially searches a large area. As the predictor locates the intersection points it is able to adjust to that location and search a smaller area, thereby enabling the system to operate faster and more efficiently. Upon initialization the predictor could be adjusted to monitor a narrower area based on various assumptions or cover a proportioned area (i.e., monitor every second or third Pixel) in order to speed up the initialization process. The resulting intersection point 88 found within the search area 82 provides the desired vehicle direction.

Figure 9:
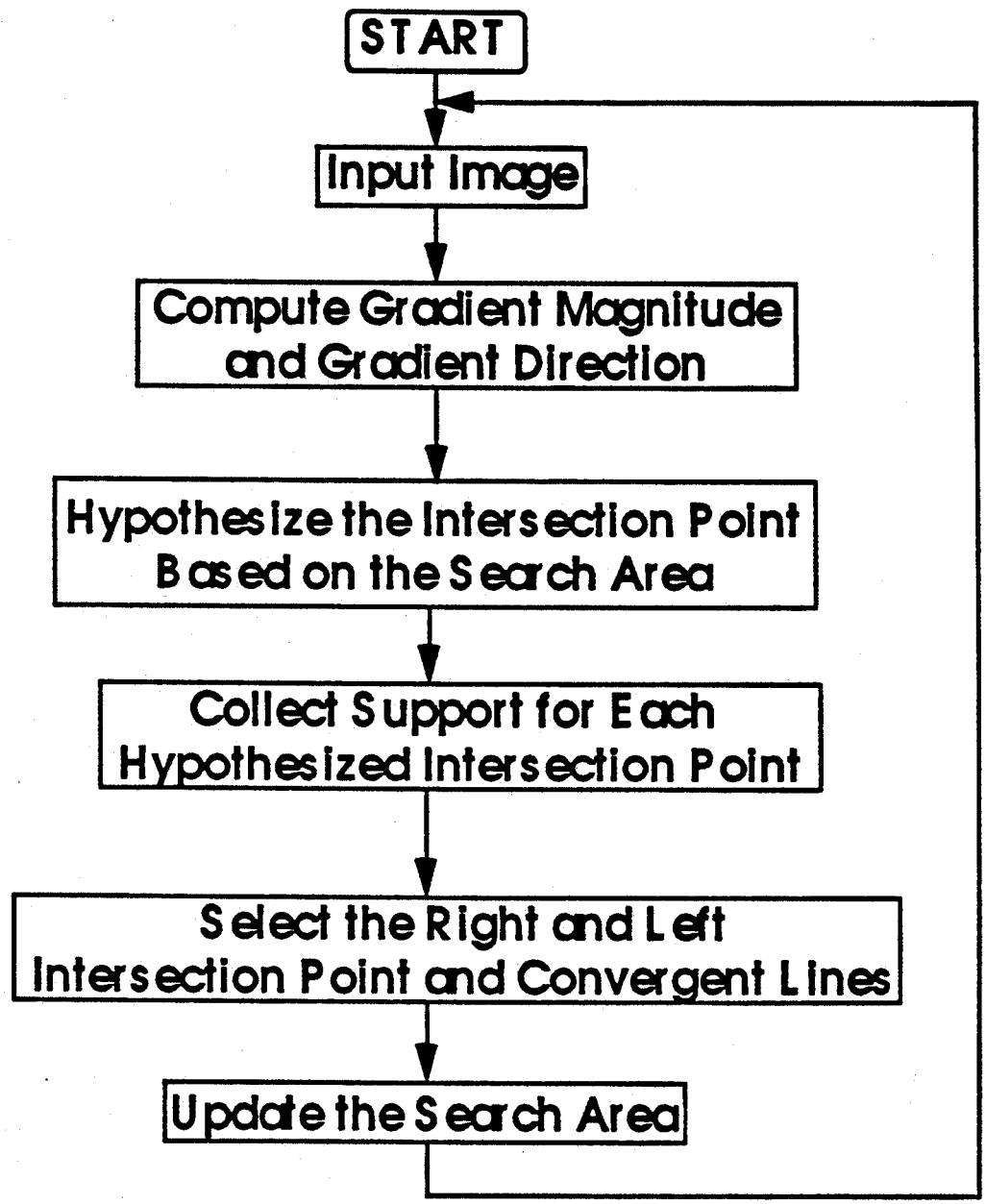
FIG. 9 is a flow chart diagram which illustrates the lane detection algorithm in accordance with the present invention.
Figure 10:
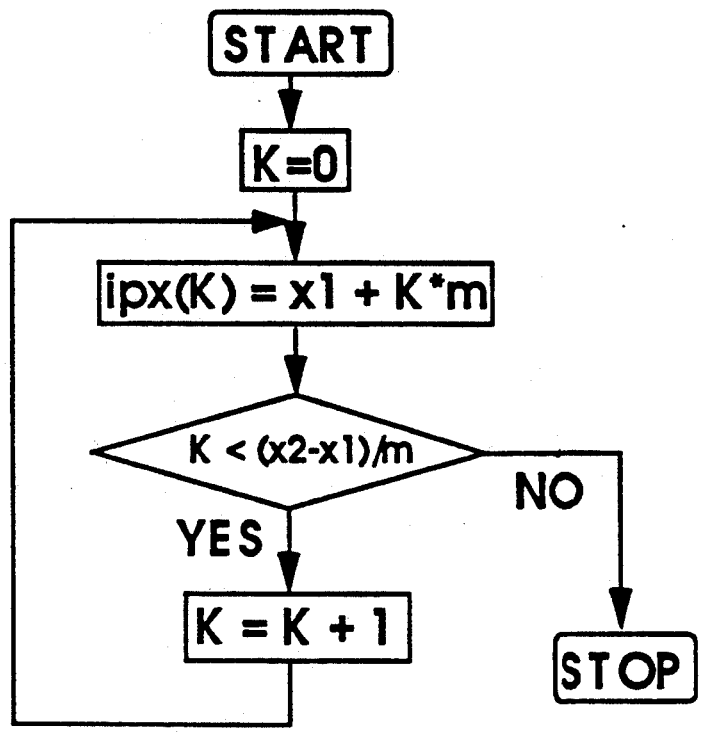
FIG. 10 is a flow chart diagram which illustrates the operation of the lane detection algorithm.
Figure 11:
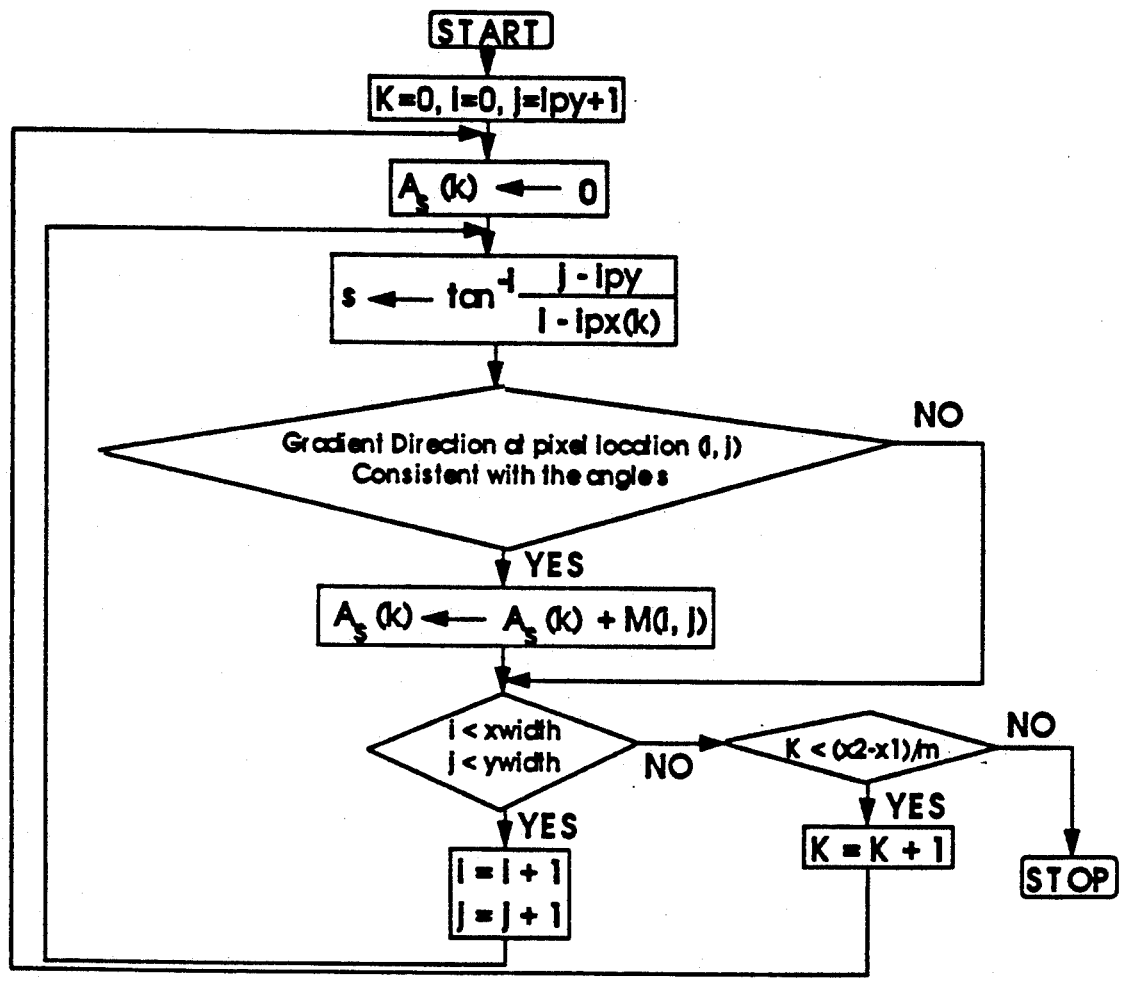
FIG. 11 is a flow chart diagram which further illustrates the operation of the lane detection algorithm.

Algorithm software flow chart diagrams are provided on FIGS. 9 through 11. The processor 14 receives an image input. The gradient magnitude and gradient direction of the image data is computed. The intersection point is then hypothesized based on the search area as shown in FIG. 10, wherein (X1, X2) specifies a one-dimensional search area in the image and m is the number of hypothesized intersection points within the one dimensional area. Then, the software then collects support for each hypothesized intersection point as shown in FIG. 11. $\{(ipx(k), ipy), k=0, 1, \ldots\}$ represents the set of image coordinates of the hypothesized intersection point. $M(i, j)$ is the gradient magnitude at pixel location (i, j) in the image, and xwidth and ywidth are the horizontal and vertical size of the one below the one-dimensional search area respectively. In addition, the right and left intersection point and convergent lines are then selected and the search area is updated prior to receiving the next image input.

In view of the foregoing, it can be appreciated that the present invention enables the user to achieve a system for automatically steering a vehicle within the lines of a road. Thus, while this invention has been described in connection with a particular example thereof, no limitation is intended thereby except as defined by the following claims. This is because the skilled practitioner will realize that other modifications can be made without departing from the spirit of this invention after studying the specification and drawings.

What is claimed is:

1. A system for automatically steering a vehicle along a lane in a road, said system comprising:
   sensor means mounted to the vehicle for generating position information about the road in front of the vehicle;
   cruise control means for controlling the speed of the vehicle, the cruise control means including a switch for initiating automatic speed control;
   processor means, coupled to the sensor means and also to the cruise control switch, for analyzing the information from the sensor means; the processor beginning the analysis of the information when the cruise control switch is engaged; and
   steering control means for automatically controlling the steering of the vehicle to maintain the vehicle within the lane in the road as a function of the analysis by the processor.

2. The system of claim 1 wherein said steering control means includes a manually actuable switch, and wherein said system initiates automatic steering of the vehicle when the driver has actuated both the cruise control switch and the steering control switch.

3. The system of claim 2 wherein manual actuation of said steering control switch further actuates said cruise control switch, thereby allowing the system to initiate automatic steering of the vehicle.

4. The system of claim 3 which further comprises:
   steering angle sensor means for detecting the angle of the wheels of the vehicle;
   said processor being coupled to the steering angle sensor means and using output signals therefrom to determine when to initiate the processing of the position information; and
   said processor further providing initialization of said processing means and the steering control means when the processing is initiated and when the driver maintains the vehicle within a lane in the road prior to actual engagement of said steering control means.

5. The system of claim 4 wherein said steering control means comprises;
   steering actuator means for controlling the steering angle of the wheels of the vehicle; and
   steering actuator control means for controlling the steering control actuator means.

6. The system of claim 5 wherein said steering actuator control means receives signals from said processor means and steering angle sensor means and determines the necessary direction for maintaining the vehicle in a desired position within the lane boundaries of a road.

7. The system of claim 6 which further comprises:

driver steering sensor means for detecting manual steering effort by the driver of the vehicle, said steering sensor means being adapted to provide a signal to said steering actuator control means to disengage the system when manual steering effort is detected and re-engage the system once the manual steering effort is no longer detected.

8. The system of claim 7 wherein said processor means comprises;
digitization means for receiving each of the plurality of frames of video images and converting said video images from analog signals to digital signals; and
digital image processing means for processing the digital signals.

9. The system of claim 8 wherein said digital image processing means further comprises:
lane identification means for providing image processing for detecting a left and a right boundary of the lane in the road in front of the vehicle; and
lane centering means for determining the desired vehicle position.

10. The system of claim 9 wherein said digital image processing means further provides for analyzing the digital signals of each frame, said analysis including detection of strong line response and consistent line orientation, said boundaries of the lane being determined as a function of said line response and line orientation.

11. The system of claim 10 wherein said processor means further comprises predictor means for determining the necessary area to be searched.

12. The system of claim 10 wherein said lane detection means determines a projected tangent line for each of said left and right boundaries within a chosen search area specified by said predictor means, said lane centering means analyzing the location of said tangent lines to determine the desired vehicle direction.

13. The system of claim 10 wherein said predictor means further provides for adjusting said search area to include the location of the intersection of said tangent lines therein.

14. The system of claim 1 wherein:
said sensor means comprises detector means for generating the position information including distance and orientation of the vehicle relative to the lane on the road;
said processor means comprising position information processing means for determining vehicle trajectory and contour of the lane in the vicinity of the vehicle; and
wherein the cruise control switch is engaged manually by the driver.

15. The system of claim 1 wherein the sensor means is a video sensor which generates a plurality of frames of video images of the road in front of the vehicle.

16. An automatic vehicle steering system for automatically steering a vehicle along a lane in a road, said system comprising:
video sensor means mounted to the vehicle for generating a plurality of frames of video images of the road in front of the vehicle;
cruise control means for controlling the speed of the vehicle, the cruise control means including a manually actuable switch for initiating speed control;
processor means coupled to the video sensor means and also to the cruise control switch, for analyzing frames of the video images;
steering control means for automatically controlling the steering of the vehicle to maintain the vehicle within the lane in the road as a function of the analysis of the processor;
steering control switch means including a manually actuable switch means for engaging the system to begin processing of the video images and provide automatic vehicle steering; and
said system initiating automatic steering of the vehicle when the driver has actuated both the cruise control switch and the steering control switch.

17. The system of claim 16 further comprising:
steering angle sensor means for detecting driver effort to steer the vehicle; and
said steering control means allowing the steering control function to be overridden while such driver effort is detected.

18. The system of claim 17 wherein said processor means comprises;
digitization means for receiving each of the plurality of frames of video images and converting said video images from analog signals to digital signals; and
digital image processing means for providing digital image processing of the digital signals.

19. The system of claim 18 wherein:
said digital image processing provides image processing for detecting a left and a right boundary of the lane in the road in front of the vehicle; and
said processor further providing initialization of said video image processing and steering control means when the processing is initiated and when the driver maintains the vehicle within a lane in the road prior to actual engagement of said steering control means.

20. The system of claim 19 wherein said digital image processing further provides for analyzing the digital signals of each frame, said analysis including detection of strong line response and consistent line orientation, said boundaries of the lane being determined as a function of said strong line response and with consistent orientation.

21. The system of claim 20 wherein said computer processor means further comprises a predictor means for improving image processing speed, said predictor means providing:
an automatically adjustable search area for determining the intersection and the location of said tangent lines therein, said search area being automatically adjusted to provide for a minimal search area.

22. A method for providing automatic steering of a vehicle along a lane in a road, said method comprising:
generating a plurality of frames of video images of the road in front of the vehicle;
controlling the speed of the vehicle with cruise control means having a manually actuable switch for initiating speed control; ·
processing the plurality of frames of video images to analyze and detect the lane boundaries of the road in front of the vehicle based on predicted possible lane boundary locations in the image and determine the direction of the lane and provide a control response that will maintain the vehicle at a desired position within the lane;
controlling the steering of the vehicle to maintain it within the lane in the road as a function of the analysis of the processor; and initiating processing of said video images and providing automatic steering control when a manually actuable steering control switch is engaged while the cruise control system is operating.

23. The method of claim 22 further comprising the step of:
disengaging the automatic steering control when a driver steering effort is detected; and
re-engaging the automatic steering control when the driver steering effort is no longer detected.

24. The method of claim 23 wherein said processing step further comprises digitizing the analog signals of said video images to provide a plurality of digital signals.

25. The method of claim 24 wherein said processing step further includes digital processing which comprises:
detecting strong line response and consistent line orientation to determine a left and a right boundary of the lane;
determining the direction necessary to maintain the vehicle in the desired position within the lane, said processing step including locating a projected tangent line extending from each of said boundaries, determining the location of each tangent line within a chosen search area and adjusting the search area to provide for the possible intersection area of the tangent lines therein, said intersection of the tangent lines being the desired vehicle direction.

26. The method of claim 22 further comprising the step of:
initializing said processing of frames and said steering controlling when said processing is initiated and the vehicle is maintained along a lane in the road prior to actual steering controlling.

27. A system for automatically steering a vehicle along a lane in a road, said system comprising:
video sensor means mounted to the vehicle for generating a plurality of frames of video images of the road in front of the vehicle;
processor means, coupled to the video sensor means for analyzing frames of the video images;
steering control means for automatically controlling the steering of the vehicle to maintain it within the lane as a function of the analysis by the processor means;
said processor means including digitization means for converting said video images from analog signals to digital signals and having digital image processing means for processing the digital signals;
said digital image processing means further including lane identification means for detecting a left and a right boundary of the lane by analyzing the digital signals and determining the lane boundaries as a function of a strong line response and a consistent line orientation, and further including lane centering means for determining the desired vehicle position;
said processor means further including a predictor means for determining an area to be searched; and
lane identification means being adapted to determine a projected tangent line from each of said left and right boundaries within a chosen search area specified by said predictor means, said lane centering means analyzing the location of said tangent lines to determine the desired vehicle direction, with said predictor means being adapted to adjust the search area to include the location of the intersection of said tangent lines therein.

* * * * *